(12) United States Patent
Shigematsu et al.

(10) Patent No.: US 6,404,147 B1
(45) Date of Patent: Jun. 11, 2002

(54) DISPLAY APPARATUS MONITORING A THRESHOLD LEVEL FOR CONTROLLING A DYNAMIC FOCUSING CIRCUIT

(75) Inventors: Haruo Shigematsu; Yoshitomo Nakamura, both of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/822,196

(22) Filed: Apr. 2, 2001

(30) Foreign Application Priority Data

Oct. 25, 2000 (JP) ........................................ 2000-325229

(51) Int. Cl.[7] .................................................. G09G 1/28
(52) U.S. Cl. ........................... 315/368.21; 315/368.18; 315/382; 315/368.22; 348/806; 313/414
(58) Field of Search ..................... 315/368.21, 368.22, 315/368.18, 368.15, 368.23, 382, 382.1, 383; 348/806, 377; 313/414

(56) References Cited

U.S. PATENT DOCUMENTS

| 5,886,482 A | * | 3/1999 | Watanabe et al. ........ 315/382.1 |
| 5,956,099 A | * | 9/1999 | Watanabe ................... 348/805 |
| 6,115,085 A | * | 9/2000 | George et al. ............... 348/806 |
| 6,049,173 A | * | 11/2000 | Murata et al. ................. 315/85 |
| 6,323,915 B1 | * | 11/2001 | Marflak et al. .............. 348/704 |
| 6,326,744 B1 | * | 12/2001 | Lee ............................. 315/382 |

FOREIGN PATENT DOCUMENTS

| JP | A11155079 | 8/1999 |
| JP | A11224618 | 8/1999 |

* cited by examiner

*Primary Examiner*—Don Wong
*Assistant Examiner*—Tuyet T. Vo
(74) *Attorney, Agent, or Firm*—Birch, Stewart, Kolasch & Birch, LLP

(57) ABSTRACT

A display apparatus including a CRT provided with an electron gun having a focusing electrode which is applied with a dynamic focusing voltage for focusing electrons drawn from a cathode of the CRT is disclosed. The display apparatus includes a dynamic focusing circuit for producing the dynamic focusing voltage by superimposing, on a dc voltage supplied from outside, an ac voltage which has a waveform varying in synchronization with horizontal and vertical deflections of an electron beam flowing to a fluorescent screen on the anode. The display apparatus further includes a compensator for lowering the dc voltage supplied to the dynamic focusing circuit by a predetermined value while a brightness signal indicative of brightness of a screen of the CRT exceeds a threshold value.

4 Claims, 3 Drawing Sheets

DISPLAY APPARATUS MONITORING A THRESHOLD LEVEL FOR CONTROLLING A DYNAMIC FOCUSING CIRCUIT

FIELD OF THE INVENTION

The present invention relates to a display apparatus including a CRT (cathode-ray tube) such as a television set or a display monitor.

BACKGROUND OF THE INVENTION

Generally, in a display apparatus including a CRT, electrons emitted from a cathode of an electron gun disposed at a neck of the CRT are focused by an electrostatic lens to converge at a fluorescent screen on the anode side. Such an electrostatic lens disposed within the electron gun is comprised of focusing electrode (generally referred to as a G3 electrode) which is applied with a focusing dc voltage.

The distance between the focusing electrode and the fluorescence screen, that is, the distance which electrons emitted form the cathode travel, varies with the points in the fluorescent screen into which they run. Accordingly, to obtain a favorable focusing characteristic throughout the screen of the CRT, it is necessary to vary the focusing voltage applied to the focusing electrode in synchronization with deflection of the electron beam. For this reason, a dynamic focusing circuit has been used to modulate the focusing voltage by use of a signal having a waveform varying in synchronization with horizontal and vertical deflections of the electron beam.

FIG. 4 shows a structure of a conventional display apparatus having such a dynamic focusing circuit. This apparatus includes a video amplifier 1, a CRT 20, a high-voltage generating circuit 10, resistor-dividing circuit 30, and a dynamic focusing circuit 40.

A conventional CRT electron gun includes a G1 electrode, a G2 electrode, and a G3 electrode disposed in that order from a cathode for drawing electrons from the cathode and focusing them. On the other hand, as shown in FIG. 4, this display apparatus uses a CRT 20 having an electron gun in which, in addition to a G1 electrode 21, a G2 electrode 22, and a G3 electrode 23, 24, a Gm electrode 26 for controlling flow of the electron beam is disposed between the G2 electrode and the G3 electrode. This CRT 20, which is referred to as a "Hi-Gm tube", is disclosed in Japanese Unexamined Patent Publication No. 224618/99.

In this figure, video signals of R, G, and B from the video amplifier 1 are supplied to a cathode 25. The high-voltage generating circuit 10 which includes a flyback transformer FBT rectifies a high pulse voltage generated in the secondary coil of the flyback transformer to produce an anode high voltage Eh to be applied to an anode 28 of the CRT 20. This anode high voltage Eh is divided by the resistor-dividing circuit 30 which includes variable resistors VR1, VR2, and resistors R30, R31, so that focusing dc voltages Ef1 and Ef2 to be applied to the G3 electrode 23 serving as a static focusing electrode and the G3 electrode 24 serving as a dynamic focusing electrode respectively are output from the variable resistors VR1 and VR2 respectively.

The dynamic focusing circuit 40 is supplied with, from outside, a horizontal parabola-form voltage whose amplitude varies along a parabola in synchronization with horizontal deflection of an electron beam and a vertical parabola-form voltage whose amplitude varies along a parabola in synchronization with vertical deflection of the electron beam. The dynamic focusing circuit 40 mixes the horizontal and vertical parabola-form voltages, and the resultant composite voltage is superimposed on the focusing voltage output from the variable resistor VR2 through a coupling capacitor CO to produce a dynamic focusing voltage. This dynamic focusing voltage is applied to the G3 electrode 24 as a focusing voltage which has been compensated for the variation of the distance between the focusing electrode and the fluorescence screen.

OBJECT AND SUMMARY OF THE INVENTION

However, when the brightness of the screen is high, or when the intensity of the anode current which is substantially equal to the electron beam current is high, the focusing characteristic deteriorates even if such a dynamic focusing circuit is used. That is because, as shown in FIG. 5, a CRT has the characteristic that Ef/Eh (%), which is preadjusted to the best focusing point that exists within the range of 20% to 50% normally, decreases as Ip increases where Ef is an optimum static or dynamic focusing voltage and Ip is an anode current, and accordingly, as the brightness increases, that is, as the anode current increases, the fixed focusing voltage produced by dividing the anode high voltage Eh under the fixed division ratio distances from the optimum focusing voltage.

In a normal-brightness state (when the anode current is below 0.8 mA for example), a shift from the optimum value is relatively small and the focus-deterioration is negligible. However, in a high-brightness state (when the anode current is from 0.8 mA to 2.4 mA for example), the shift is as much as 2% to 3% (a hatched portion in FIG. 5), and therefore the focus-deterioration is not negligible where image quality is degraded conspicuously.

The above-described problem becomes more acute in a display apparatus using the Hi-Gm tube. That is because, since the amplitude of a cathode voltage required to generate the same anode current in the Hi-Gm tube is less than half the amplitude required of a conventional CRT, and therefore the anode current (electron beam) can be more than twice the anode current generated in the conventional CRT for the same amplitude of the cathode voltage, high contrast can be obtained more easily, but the situation of a large anode current flowing (or high-brightness state) occurs more frequently for that.

The present invention has been made to solve the above-described problem with an object to provide a display apparatus which does not exhibit the deterioration in the focusing characteristic in a high-brightness state. This object is achieved by a display apparatus including:

a CRT provided with an electron gun having a focusing electrode which is applied with a dynamic focusing voltage for focusing electrons drawn from a cathode of the CRT;

a dynamic focusing circuit for producing the dynamic focusing voltage by superimposing, on a dc voltage supplied from outside, an ac voltage which has a waveform varying in synchronization with horizontal and vertical deflections of an electron beam flowing to a fluorescent screen on an anode side of the CRT; and a compensator for lowering the dc voltage supplied to the dynamic focusing circuit by a predetermined value while a brightness signal indicative of brightness of a screen of the CRT exceeds a threshold value.

The electron gun may have the cathode, and a G1 electrode, a G2 electrode and a G3 electrode disposed in that order for drawing electrons from the cathode, the G3 electrode serving as the focusing electrode, the electron gun further having a Gm electrode between the G2 and G3 electrodes for controlling flow of the electron beam.

The display apparatus may further include a voltage divider for dividing a high voltage applied to an anode of the CRT to produce the dc voltage, the voltage divider including a variable resistor and a dividing resistor connected in series across the anode and a ground.

The compensator may include an operational amplifier for outputting a difference between a voltage across a brightness-detection resistor through which an anode current flows and a reference voltage, and an impedance control circuit including a resistor having a predetermined impedance and a switching circuit for connecting or disconnecting the resistor in parallel with the dividing resistor depending on polarity of the difference output by the operational amplifier.

BRIEF DESCRIPTION OF THE DRAWINGS

Embodiments of the invention will now be described by way of example and with reference to the accompanying drawings in which.

DESCRIPTION OF THE PREFERRED EMBODIMENTS

Figure 1:
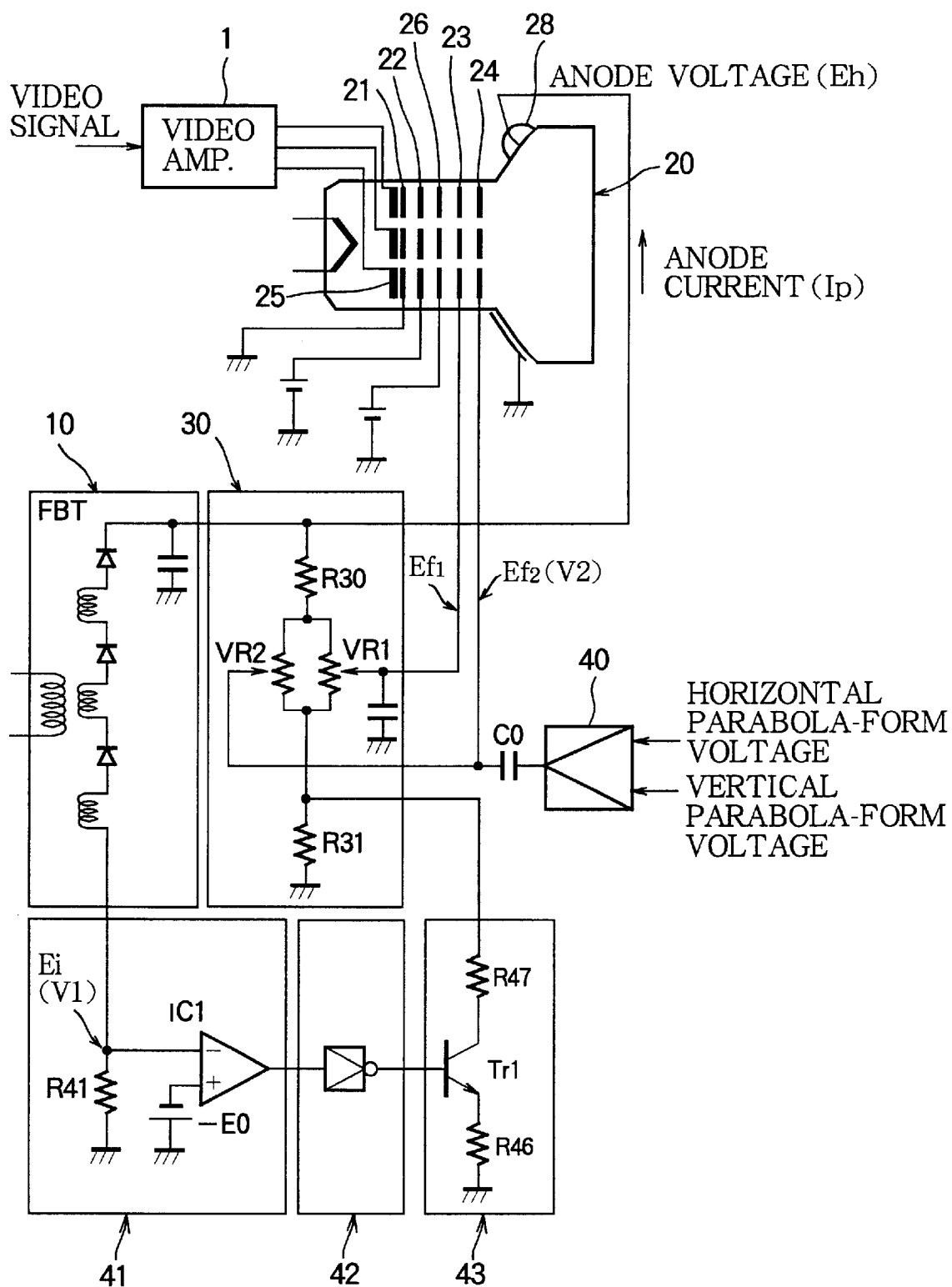
FIG. 1 is a block diagram showing a structure of an example of the display apparatus according to the invention.

FIG. 1. shows a structure of an example of the display apparatus according to the invention. In FIG. 1, reference numerals identical to those in FIG. 4 represent the same elements.

Figure 4:
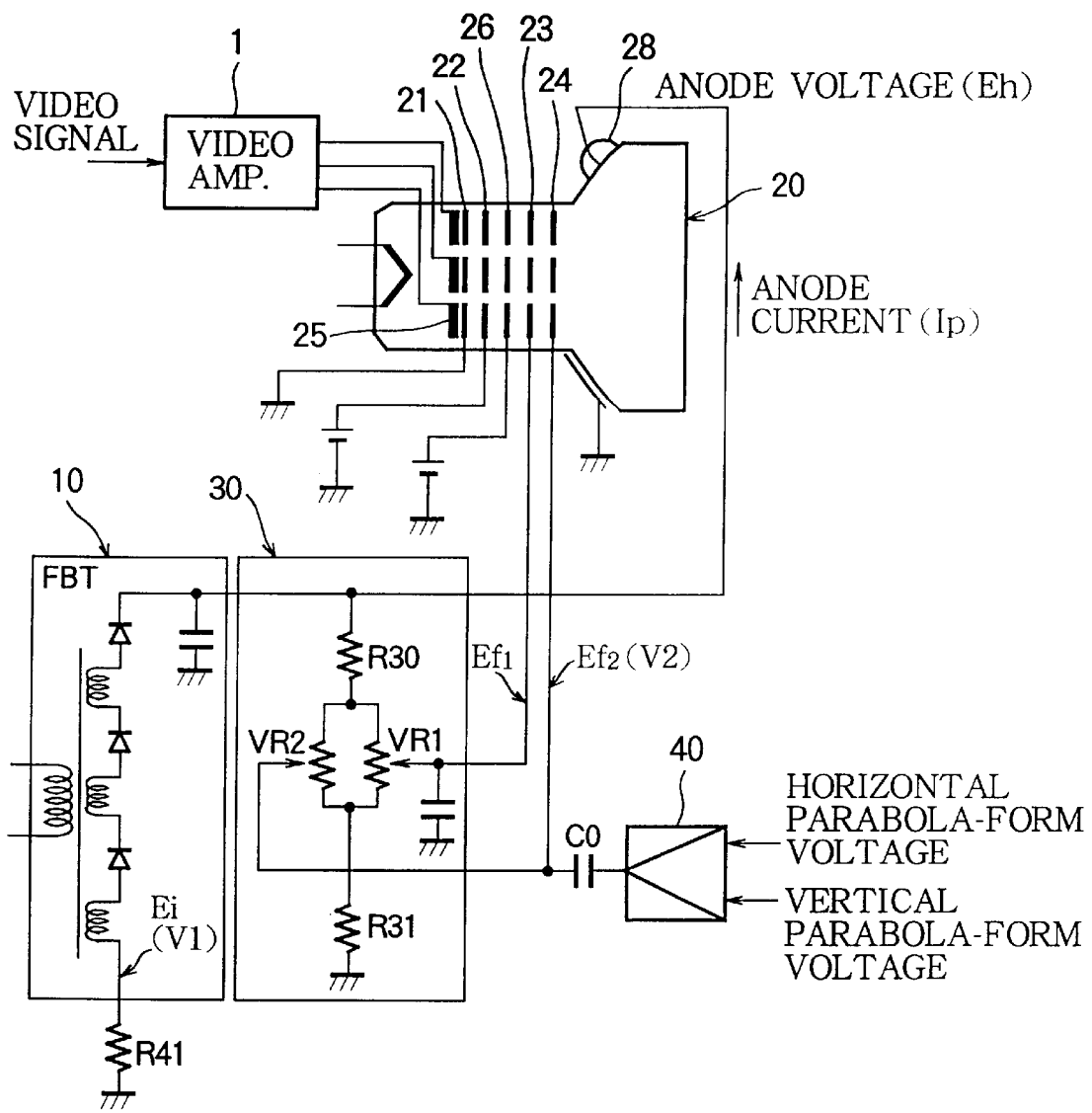
FIG. 4 is a block diagram showing a structure of a conventional display apparatus.
Figure 5:
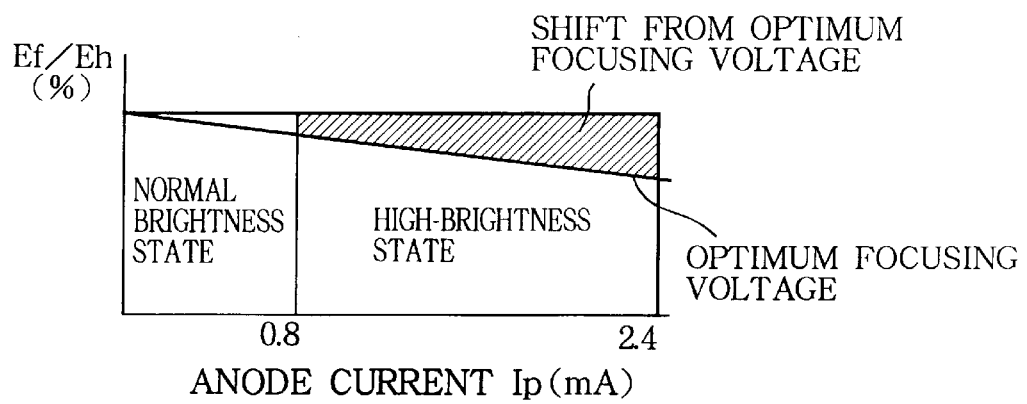
FIG. 5 is a graph explaining the relationship between an anode current and an optimum focusing voltage.

The display apparatus of this example includes a video amplifier 1, a CRT 20, a high-voltage generating circuit 10, a resistor-dividing circuit 30, and a dynamic focusing circuit 40 as in the case of the display apparatus shown in FIG. 4. The apparatus of this example differs from the display apparatus of FIG. 4 in that it has a high-brightness-detection circuit 41, an inversion-amplification circuit 42, and an impedance control circuit 43.

In this figure, video signals of R, G, and B from the video amplifier 1 are supplied to a cathode 25. The high-voltage generating circuit 10 which includes a flyback transformer FBT rectifies a high pulse voltage generated in the secondary coil of the flyback transformer to produce an anode high voltage Eh to be applied to an anode 28 of the CRT 20. This anode high voltage Eh is divided by the resistor-dividing circuit 30 which includes variable resistors VR1, VR2, and resistors R30, R31, so that focusing dc voltages Ef1 and Ef2 to be applied to the G3 electrode 23 serving as a static focusing electrode and the G3 electrode 24 serving as a dynamic focusing electrode respectively are output from the variable resistors VR1 and VR2 respectively.

The dynamic focusing circuit 40 is supplied with, from outside, a horizontal parabola-form voltage whose amplitude varies along a parabola in synchronization with horizontal deflection of an electron beam and a vertical parabola-form voltage whose amplitude varies along a parabola in synchronization with vertical deflection of the electron beam. The dynamic focusing circuit 40 mixes the horizontal and vertical parabola-form voltages, and the resultant composite voltage is superimposed on the focusing voltage output from the variable resistor VR2 through a coupling capacitor CO to produce a dynamic focusing voltage. This dynamic focusing voltage is applied to the G3 electrode 24 as a focusing voltage Ef2 (V2) that has been compensated for the variation of the distance between the focusing electrode and the fluorescence screen.

In the display apparatus of this example, a negative brightness-detection voltage or a voltage drop due to a current flowing through a resistor R41 within the high-brightness-detection circuit 41 is input to a negative input terminal of an operational amplifier IC1 as a brightness-detection signal Ei, and a reference voltage (−E0), which is equivalent to a voltage of the brightness-detection signal Ei when the intensity of an anode current is 0.8 mA, to a positive input terminal of the operational amplifier IC1. The operational amplifier IC1 outputs the difference between these voltages. The voltage of this difference is inverted and amplified by the inversion-amplification circuit 42, and is applied to the base of a transistor Tr1 within the impedance control circuit 43.

When the anode current increases (when the brightness increases) and the absolute value of the voltage of the brightness-detection signal Ei exceeds the reference voltage (−E0) causing the polarity of the output signal of the operational amplifier IC1 to change, a resistor R47 and a resistor R46 within the impedance control circuit 43 are connected in parallel with a resistor R31 of the resistor-dividing circuit 30. Then, the current flowing into the resistor R30 of the resistor-dividing circuit 30 increases and the value of a voltage drop across the resistor 30 increases, so that the focusing voltages output from the variable resistors VR1 and VR2 are lowered at the same time.

Figure 2:
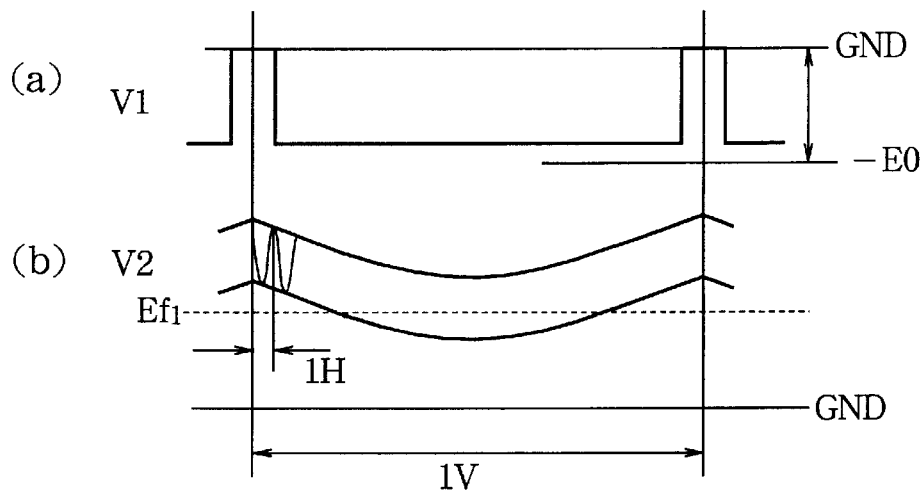
FIG. 2 is a view showing waveforms of a brightness-detection signal and a dynamic focusing voltage.

In a case where the voltage V1 of the brightness-detection signal Ei does not fall below the reference voltage (−E0) over an entire vertical deflection period (1 V), or there is no high-brightness span over which the voltage V1 of the brightness-detection signal Ei exceeds the reference voltage (−E0) in a vertical deflection period (1 V) as shown in FIG. 2(a), the transistor Tr1 remains off, and the voltage V2 applied to the G3 electrode 24 is equal to a superimposition of the output voltage of the variable resistor VR2 and the output voltage of the dynamic focusing circuit 40, that is, it is a dynamic focusing voltage produced by superimposing the horizontal parabola-form voltage having a period equal to a horizontal deflection period 1 H and the vertical parabola-form voltage having a period equal to the vertical deflection period 1 V on the output voltage of the variable resistor VR2, as represented by the curve of FIG. 2(b). FIG. 2(c) is an enlarged view of the waveform of such a dynamic focusing voltage. The straight line (dotted line) of FIG. 2(b) represents the waveform of the static focusing voltage Ef1 applied to the G3 electrode 23 (static focusing electrode).

Figure 3:
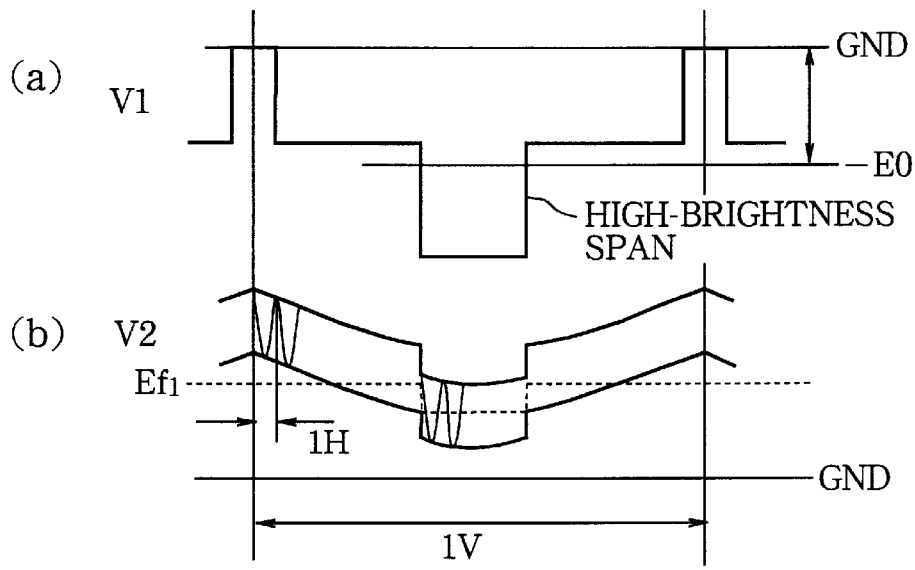
FIG. 3 is a view showing waveforms of a brightness-detection signal having a high-brightness span and a dynamic focusing voltage.

On the other hand, in a case where there exists a high-brightness span over which the voltage V1 of the brightness-detection signal Ei exceeds the reference voltage (−E0) in a vertical deflection period (1 V) as shown in FIG. 3(a), the transistor Tr1 is turned on for a time period corresponding to this high-brightness span, causing the output voltages of the variable resistors VR1, VR2 to reduce. Accordingly, the dynamic focusing voltage Ef2 (V2) applied to the G3 electrode 24 is lowered for the time period corresponding to this high-brightness span. Likewise, the static focusing voltage Ef1 represented by the straight line (dotted line) of FIG. 3(b) is lowered for the time period corresponding to this high-brightness span.

As described above, in the display apparatus of this example, since the dynamic focusing voltage applied to the G3 electrode 24 and the static focusing voltage applied to the G3 electrode 23 are lowered automatically if a brightness signal indicative of the brightness of the screen display is at a high level, it is possible to prevent the focusing characteristic from deteriorating for the high-brightness span without affecting the focusing characteristic for the other normal-brightness span.

The above explained preferred embodiments are exemplary of the invention of the present application which is described solely by the claims appended below. It should be understood that modifications of the preferred embodiments may be made as would occur to one of skill in the art.

What is claimed is:

1. A display apparatus comprising:
   a CRT provided with an electron gun having a focusing electrode which is applied with a dynamic focusing voltage for focusing electrons drawn from a cathode of said CRT;
   a dynamic focusing circuit for producing said dynamic focusing voltage by superimposing, on a dc voltage supplied from outside, an ac voltage which has a waveform varying in synchronization with horizontal and vertical deflections of an electron beam flowing to a fluorescent screen on an anode side of said CRT; and
   a compensator for lowering said dc voltage supplied to said dynamic focusing circuit by a predetermined value while a brightness signal indicative of brightness of a screen of said CRT exceeds a threshold value.

2. A display apparatus according to claim 1, in which said electron gun has said cathode, and a G1 electrode, a G2 electrode and a G3 electrode disposed in that order for drawing electrons from said cathode, said G3 electrode serving as said focusing electrode, said electron gun further having a Gm electrode between said G2 and G3 electrodes for controlling flow of said electron beam.

3. A display apparatus according to claim 1, further comprising a voltage divider for dividing a high voltage applied to an anode of said CRT to produce said dc voltage, said voltage divider including a variable resistor and a dividing resistor connected in series across said anode and a ground.

4. A display apparatus according to claim 3, in which said compensator includes an operational amplifier for outputting a difference between a voltage across a brightness-detection resistor through which an anode current flows and a reference voltage, and an impedance control circuit including a resistor having a predetermined impedance and a switching circuit for connecting or disconnecting said resistor in parallel with said dividing resistor depending on polarity of said difference output by said operational amplifier.

\* \* \* \* \*